Jan. 1, 1935.  J. B. HEID  1,986,198
PROCESS FOR THE MANUFACTURE OF CARBON BLACK
Filed Feb. 8, 1930
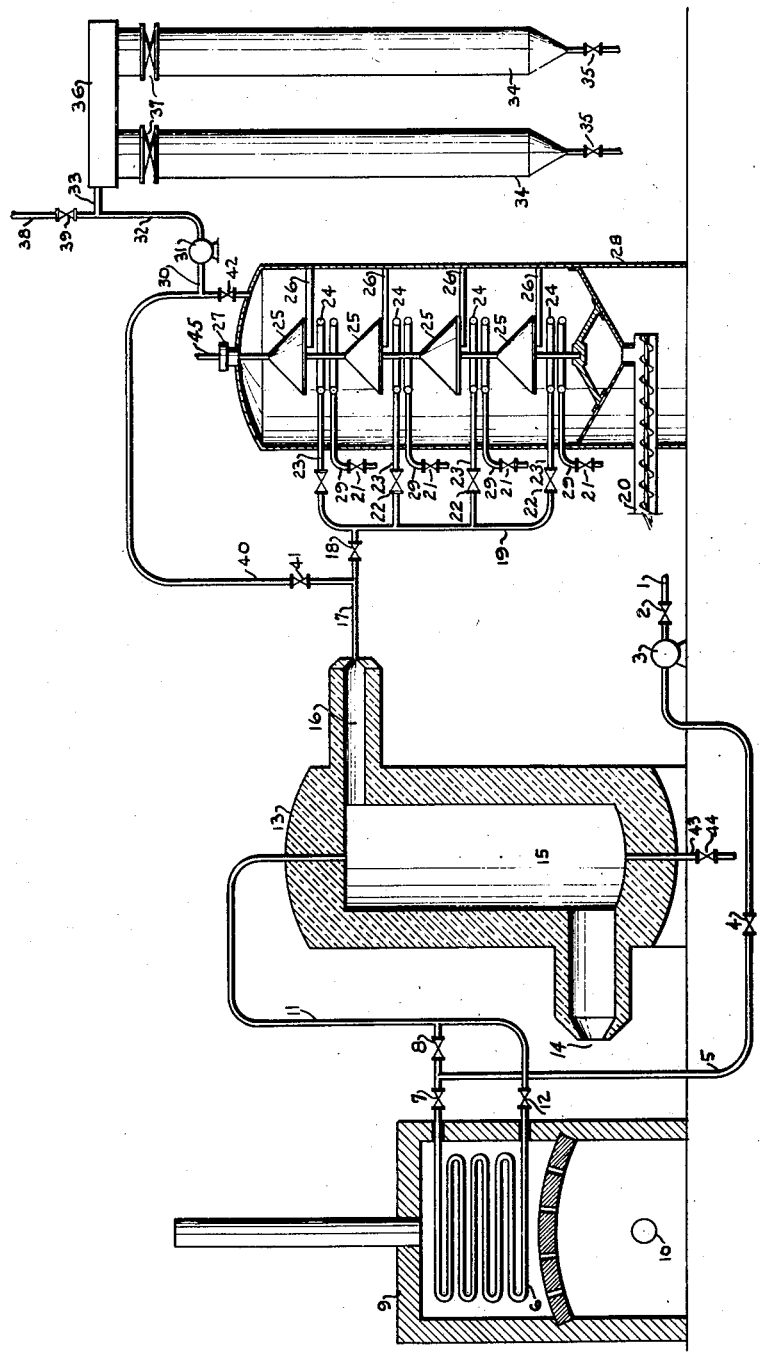
INVENTOR
Jacob Benjamin Heid
BY Frank L. Belknap
ATTORNEY Patented Jan. 1, 1935

1,986,198

UNITED STATES PATENT OFFICE 1,986,198

PROCESS FOR THE MANUFACTURE OF CARBON BLACK

Jacob Benjamin Heid, Chicago, Ill., assignor to Universal Oil Products Company, Chicago, Ill., a corporation of South Dakota Application February 8, 1930, Serial No. 426,811

4 Claims. (Cl. 134—60)

This invention relates to the manufacture of carbon black and is specifically directed to a new and novel process for the manufacture of carbon black from hydrocarbon oils.

The successful processes in commercial use for the manufacture of carbon black derive from natural gas a high grade product suitable for use in the manufacture of the better grades of pigments, formed carbon shapes for electrical equipment, as a high grade filler for rubber tires, etc. Many attempts have been made to manufacture a similar product by the combustion of petroleum oils and petroleum residues but the products so made from oils or their residues have, to the best of my knowledge, always been of an inferior nature and owing, no doubt, to its inferior quality and the desire on the part of the consumer to differentiate between the high grade and the low grade product, the product made from petroleum is generally known as lamp black rather than carbon black.

It has been proposed to convert petroleum oils into gas by processes similar to the well known method of manufacturing city or artificial gas and to manufacture carbon black from the gas thus produced. This process is obviously an expensive one not only for the reason that the gas making process itself is expensive but also due to the fact that such processes require a relatively high grade oil as charging stock. The oil so used is not even in its crude state but is a valuable distillation product known generally to the trade as gas oil. It is obvious that with the present plentiful supply of natural gas the expensive method of manufacturing carbon black from artificial gas is not warranted.

The process which I have invented for the manufacture of carbon black provides for the use of a low grade or inexpensive oil and provides a simple, inexpensive and effective system for converting the oil into a mixed gas and vapor state resembling gas to the extent that its combustion, under the desired conditions, promotes the formation of a product comparable in quality to the carbon black product from artificial gas or even from natural gas.

The process may be best described with reference to the attached drawing which represents diagrammatically an elevation of one of the many forms of suitable apparatus for carrying out my invention.

Referring to the drawing, which is not drawn to scale, the oil used as raw material or charging stock to the process is supplied to pump 3 through line 1 and valve 2 and is fed by pump 3 through valve 4, line 5 and valve 7 into the heating element 6 located in the suitable furnace 9. Fuel supplied by suitable means, not shown, through the burner port 10 and sufficient heat is maintained around the heating element 6 to vaporize a substantial quantity of the oil passing through the heating element. The heated and partially or totally vaporized oil emerges through the heating element 6 through line 11 and valve 12 and is introduced into the gasifying chamber 15.

It may not be necessary in some cases to pass the oil through the heating element, in which event valves 7 and 12 are closed and valve 8 is opened, the oil passing directly from line 5 to line 11 and thence to the chamber 15 or, if so desired, a portion of the oil may pass through the heating element and a portion through valve 8 direct to line 11 without traversing the heating element.

The oil is, however, eventually discharged into the chamber 15 and may be so discharged in a liquid state, in a vaporized state, in a mixed vaporized and liquid state, or even in a partially gasified or cracked state. Combustibles are introduced by suitable means such as a burner, not shown, through port 14 and burned in chamber 15, the gaseous products of combustion mixing or combining with and heating the fluid introduced to the chamber 15 through line 11. The heating of the fluid, caused by its contact with the hot combustion gases, may be of such a degree that substantial amounts of fixed gas and/or other cracked products are formed by the resulting reaction or may simply be sufficient to cause substantial vaporization of the oil. In any event the vaporous hydrocarbon products are mixed with the hot combustion products and the combined material passes through the duct 16, line 17 and through valve 18 into the header line 19 and thence through the valves 22 and branch lines 23 to the burners 24. Line 43 and valve 44 provide a means of draining off any heavy unvaporized and unburned material which may collect in chamber 15.

The burners 24 may be in the form of perforated coils from which the mixed hydrocarbon products and combustion products from chamber 15 may escape to undergo incomplete combustion for the formation of carbon black. The combustion zone, in this case, is a closed tank 28 into which air is introduced in controlled quantities through lines 29 controlled by valves 21. The quantity of air introduced into the combustion zone is in all cases less than that required for complete combustion of the hydrocarbon products introduced through the lines 23 and is, in the case illustrated, introduced at a plurality of points close to the various points of introduction of the hydrocarbon products to be burned. The carbon collectors 25, in this specific case, take the form of substantially flat discs on the bottom of which carbon black is continuously collected and from which it is continuously removed by the scrapers 26. The collecting and scraping operations are made continuous by rotation of the discs 25 and the shaft 45 upon which the discs are mounted, by suitable driving mechanism, not shown. The top of the carbon collecting discs 25 may be cone shaped, as shown in the drawing, so that carbon black will not readily adhere to their upper surfaces but will fall to the bottom of the zone 28 and be continuously removed by the conveyor 20 which is driven by any suitable means, not shown.

The vacuum pump or blower 31 serves to continuously exhaust the products from zone 28 through valve 42 and line 30 and passes them through lines 32 and 33 into the distributing header 36 from which the products may pass alternately or in parallel through valves 37 into a multiplicity of carbon black collectors 34. The carbon collectors 34 as here illustrated are in the form of elongated fabric or cloth bags which permit the gases in the products from zone 28 to pass through their sides but are of sufficiently close texture to retain the carbon black. The carbon black collectors 34 may be first alternately filled with carbon and then alternately removed and cleaned or they may, if need be, be used simultaneously and the carbon black may be removed therefrom through valves 35.

Air may be blown into the system for cleaning purposes after the operation through line 38 and valve 39 and if so desired, through line 40 and valve 41. Line 40, valve 41, lines 30, 32 and 38, valve 39 and, if necessary, pump 31 may be used to by-pass zones 28 and 34 while operations are being started and zone 15 is being heated up.

It will be understood that atmospheric, superatmospheric or sub-atmospheric pressure may be maintained in the heating element 6, in the chamber 15 and in zone 28 and that equalized or differential pressures may be maintained throughout the system as desired.

An alternate method of operation, means for which is not illustrated, may be to cool the mixed hydrocarbon products and products of combustion from chamber 15 before they are burned in zone 28. The feature of this alternative lies in the recovery, by cooling, of any easily condensed material in the products from chamber 15. This recovered condensate may be utilized in any of a number of ways among which are reconversion or possibly simple redistillation for the production of motor fuels and other light products. Another possible advantage in the alternate operation described may reside in the fact that a comparatively dry gas, from which condensable vapors, mist, water, etc., have been removed, may then be utilized for carbon black production. However, in its preferred embodiment, the mixed hydrocarbon products and combustion products are subjected to incomplete combustion, for the production of carbon black, while said mixture is in a heated state. It will be readily understood that, although means are not shown, the mixed uncondensed hydrocarbons and combustion products may be reheated, if desired, after being subjected to condensation and before being burned.

As a specific example of an operation such as may be carried out in the above described process, a heavy oil, such as a residual product from cracking, is heated in the heating element 6 under a pressure of approximately 100 pounds per square inch to an outlet temperature of 700° F. or more less.

The oil may even contain substantial proportions of heavy pitch-like or carbonaceous material such as would render it useless for sale as fuel or may be of a heavy nature too viscous at ordinary temperatures for use as fuel. It is possible to feed such oil through the heating element 6 at such high velocity that little or no carbonaceous material will be deposited in the heating element, especially in view of the relatively mild temperatures employed, or it may, in some cases, be desirable to by-pass the heating element 6 and feed the oil, hot from the process in which it is made, into the chamber 15.

The pressure on chamber 15 is preferably reduced to substantially atmospheric pressure. Combustible products, such as portions of the same oil as that fed to the process and air, are introduced through port 14 and burned in chamber 15, the combustion products combining or mixing at a temperature of say 1400° F. with the hydrocarbon fluid introduced into chamber 15. The temperature of the combustion products causes the cracking of substantial portions of the hydrocarbon fluid and the product entering zone 28 through lines 23 to be burned for the production of carbon black may consist of a mixture of fixed or cracked gases, combustion products and vaporized hydrocarbons. This mixture is burned in zone 28 in an atmosphere sufficiently deficient in air for the formation of large quantities of carbon black.

The carbon black removed from the process by the conveyor 20 and the carbon black collected in the collectors 34 amounts in this case, to about 60 pounds per barrel of oil treated and is of a quality suitable for sale and for use in the manufacture of pigments, rubber tires, etc.

I claim as my invention:

1. A process for producing carbon black from hydrocarbon oil which comprises passing said oil under superatmospheric pressure through a heating zone wherein the oil is partially vaporized, introducing said partially vaporized oil into a mixing zone maintained at reduced pressure and increased temperature, introducing hot combustion products into said mixing zone whereby the partially vaporized oil is completely vaporized and a substantial portion thereof is cracked, removing the mixture of cracked gases, combustion products and vaporized hydrocarbons with any entrained carbon black, subjecting said mixture to incomplete combustion to form carbon black, and collecting the carbon black thus produced.

2. A process for producing carbon black from hydrocarbon oil which comprises passing said oil through a heating zone wherein the oil is partially vaporized, introducing said partially vaporized oil to a mixing zone maintained at a higher temperature than said first-mentioned heating zone, introducing hot combustion products into said mixing zone whereby the partially vaporized oil is completely vaporized and a substantial portion thereof is cracked, removing the mixture of cracked gases, combustion products and vaporized hydrocarbons with any entrained carbon black, subjecting said mixture to incomplete combustion to form carbon black, and collecting the carbon black thus produced.

3. A process for producing carbon black from hydrocarbon oil which comprises passing said oil through an initial heating zone wherein the oil is partially vaporized, introducing said partially vaporized oil into a mixing zone, introducing hot combustion products into said mixing zone, whereby the partially vaporized oil is completely vaporized, removing the mixture of combustion products and oil vapors with any entrained carbon black, subjecting said mixture to incomplete combustion to form carbon black, and collecting the carbon black thus produced.

4. A process for producing carbon black from hydrocarbon oil which comprises passing said oil through an initial heating zone wherein the oil is substantially vaporized, introducing said substantially vaporized oil into a mixing zone wherein the oil vapors are intimately mixed with hot combustion products and wherein the oil vapors are superheated, removing the mixture of oil vapors and combustion gases with any entrained carbon black from said mixing zone, subjecting the mixture to incomplete combustion to form carbon black, and collecting the carbon black thus produced.

JACOB BENJAMIN HEID.